United States Patent [19]
Wakamiya

[11] Patent Number: 4,832,470
[45] Date of Patent: May 23, 1989

[54] INVERTED GALILEAN TELESCOPE TYPE VIEWFINDER SYSTEM CAPABLE OF CHANGING OVER THE MAGNIFICATION

[75] Inventor: Koichi Wakamiya, Tokyo, Japan
[73] Assignee: Nikon Corporation, Tokyo, Japan
[21] Appl. No.: 152,547
[22] Filed: Feb. 5, 1988
[30] Foreign Application Priority Data
Feb. 13, 1987 [JP] Japan .................................. 62-31103
[51] Int. Cl.$^4$ ...................... G02B 15/02; G02B 13/10; G02B 1/18
[52] U.S. Cl. .................................... 350/453; 350/422; 354/195.12; 354/222
[58] Field of Search ................ 350/422, 453; 354/219, 354/222, 195.12

[56] References Cited
U.S. PATENT DOCUMENTS

| | | | |
|---|---|---|---|
| 2,755,701 | 0/1956 | Altman | 350/423 |
| 3,141,921 | 7/1964 | Linke | 354/222 X |
| 4,256,396 | 3/1981 | Kawaguchi et al. | 354/222 |
| 4,653,887 | 3/1987 | Wakamiya | 350/422 X |
| 4,715,692 | 12/1987 | Yamada et al. | 354/222 X |

FOREIGN PATENT DOCUMENTS
60-26323  2/1985  Japan .
60-166933 8/1985  Japan .

*Primary Examiner*—John K. Corbin
*Assistant Examiner*—Scott J. Sugarman
*Attorney, Agent, or Firm*—Shapiro and Shapiro

[57] ABSTRACT

A viewfinder system capable of changing over the magnification includes an objective lens unit having at least two negative lens elements replaceable with each other for magnification change-over, and an eyepiece unit having a positive refractive power and constituting an inverted Galilean telescope type viewfinder with the objective lens unit. When the radius of curvature of that surface of one negative lens element for low magnification which is adjacent to the object side is $rw_1$ and the radius of curvature of that surface of said one negative lens element which is adjacent to the eyepiece side is $rw_2$ and the radius of curvature of that surface of the other negative lens element for high magnification which is adjacent to the object side is $rT1$ and the radius of curvature of that surface of said other negative lens element which is adjacent to the eyepiece side is $rT2$ and $Q_W$ and $Q_T$ are defined as $$Q_W = (rw_2 + rw_1)/(rw_2 - rw_1)$$

$$Q_T = (rT2 + rT1)/(rT2 - rT1)$$

the negative lens elements replaceable with each other satisfy the following conditions:

$Q_W < 0$ (1)

$Q_T > 0$ (2)

$-5 < Q_T/Q_W < 0$ (3).

7 Claims, 3 Drawing Sheets

INVERTED GALILEAN TELESCOPE TYPE VIEWFINDER SYSTEM CAPABLE OF CHANGING OVER THE MAGNIFICATION

BACKGROUND OF THE INVENTION

1. Field of the Invention

This invention relates to an inverted Galilean telescope type viewfinder optical system, and in particular to an inverted Galilean telescope type viewfinder system of the magnification change-over type suitable for use in a focal length change-over type compact camera or an electronic camera or the like.

2. Related Background Art

Heretofore, in a focal length change-over type compact camera or the like, use has often ben made of an inverted Galilean telescope type viewfinder of the type in which the viewfinder magnification is changed over in response to the change-over of the focal length of a photo-taking lens. As such a viewfinder of the magnification change-over type, there are known the techniques disclosed, for example, in U.S. Pat. No. 2,755,701, Japanese Laid-Open Patent Application No. 166933/1985 and Japanese Laid-Open Patent Application No. 26323/1985.

Of these known techniques, the viewfinder disclosed in U.S. Pat. No. 2,755,701 is of the type in which only a negative lens in an objective lens comprising a positive lens and a negative lens is slidden in the direction of the optic axis to thereby change the combined focal length of the objective lens and change the viewfinder magnification, and if the magnification change ratio becomes greater, the range of movement of the negative lens for a magnification change becomes greater, and this has lead to the disadvantage that such viewfinder cannot be made into a compact viewfinder of short full length. Also, there is a system in which mounting and dismounting of an additional negative lens and sliding of another negative lens in the direction of the optic axis are combined together to thereby change the combined focal length of the objective lens, but in the low magnification state, an additional lens is inserted rearwardly of said another negative lens and at least two negative lenses are used as the objective lens and therefore, such system has the tendency that the full length becomes greater if an attempt is made to enhance the negative refractive power of the additional lens and change the magnification change ratio, and this is more disadvantageous for providing a compact viewfinder as the magnification change ratio becomes higher.

Also, in the viewfinder of Japanese Laid-Open Patent Application No. 166933/1985, which is of the type which assumes a two-group construction of a negative lens and a positive lens in the low magnification state and assumes a three-group construction of a positive lens, a negative lens and a positive lens with a positive lens added to the two-group construction, the effective diameter of the positive lens as a first lens added in the high magnification state becomes great with a result that the viewfinder becomes bulky. Also, this viewfinder is designed such that for a magnification change of the viewfinder, the negative lens is moved and the positive lens is additionally inserted in place of it, and this leads to the disadvantage that a moving mechanism for the lens becomes complicated.

The viewfinder of Japanese Laid-Open Patent Application No. 26323/1985, like the present invention, is of the type in which the negative lens as the objective lens is interchanged to the thereby change over the viewfinder magnification. However, its magnification change ratio is up to the order of 1.78 times as shown in the embodiment of this patent application. To further increase this magnification change ratio so as to correspond to the magnification change ratio of a photo-taking lens, it is necessary to weaken the refractive power of a negative lens for high magnification or strengthen the refractive power of a negative lens for low magnification. However, if the refractive power of the negative lens for high magnification is weakened, that negative lens comes close to an optical member on the eyepiece side and the marginal portion of the second surface directing a concave surface toward the eyepiece side may contact the optical member on the eyepiece side and therefore, the magnification cannot be made sufficiently high. Also, if the refractive power of the negative lens for low magnification is strengthened, there is the disadvantage that the viewfinder magnification in the low magnification state becomes too small.

SUMMARY OF THE INVENTION

It is therefore an object of the present invention to overcome the above-noted disadvantages peculiar to the prior art viewfinders and to provide an inverted Galilean telescope type viewfinder system of the magnification change-over type which keeps a compact shape and a high magnification and yet in which the magnification change ratio is high and various aberrations are corrected well.

The inverted Galilean telescope type viewfinder of the magnification change-over type has, in succession from the object side, an objective lens unit having a negative refractive power and an eyepiece unit having a positive refractive power, and is basically of a construction in which, in said objective lens unit of a negative refractive power, at least one negative lens is replaced with a negative lens having a different refractive power to thereby change over the magnification. When, of a pair of negative lenses replaced with each other in said objective lens unit for a magnification change, the radius of curvature of that surface of the negative lens disposed in the low magnification state which is adjacent to the object side is $rw_1$ and the radius of curvature of that surface of said negative lens which is adjacent to the eyepiece side of $rw_2$ and the radius of curvature of that surface of the negative lens disposed in the high magnification state which is adjacent to the object side is $rT_1$ and the radius of curvature of that surface of said negative lens which is adjacent to the eyepiece side is $rT_2$ and the shape factors $Q_W$ and $Q_T$ of those negative lenses are defined as $$Q_W = \frac{rw_2 + rw_1}{rw_2 - rw_1} \text{ and } Q_T = \frac{rT_2 + rT_1}{rT_2 - rT_1},$$

respectively, the viewfinder of the present invention satisfies the following conditions:

$Q_W < 0$        (I)

$Q_T > 0$        (II)

$-5 < Q_T/Q_W < 0.$        (III)

According to the present invention which satisfies the above conditions, there is realized an inverted Galilean telescope type viewfinder of the magnification change-over type which keeps a compact shape and a high magnification and yet in which the magnification change ratio is high and an excellent optical performance is maintained.

Other objects, features and effects of the present invention will become more fully apparent from the following detailed description of the invention taken in conjunction with the accompanying drawings.

DESCRIPTION OF THE PREFERRED EMBODIMENTS

Figure 1:
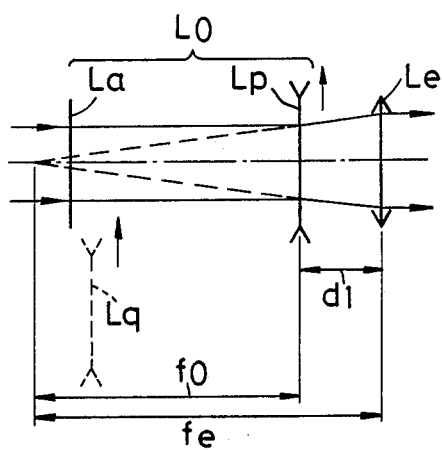
FIG. 1 illustrates the fundamental construction of the high magnification state of an inverted Galilean telescope type viewfinder of the magnification change-over type according to the present invention.
Figure 2:
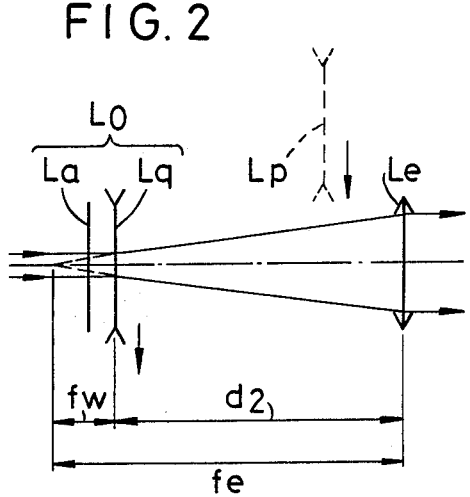
FIG. 2 illustrates the fundamental construction of the low magnification state of the viewfinder shown in FIG. 1.

FIG. 1 illustrates the principle of the high magnification state of an inverted Galilean telescope type viewfinder of the magnification change-over type, and FIG. 2 illustrates the principle of the low magnification state of said viewfinder. In order to make the way of view easy to understand, the refractive power of a fixed optical member La such as window glass or a fixed lens positioned most adjacent to an objective lens is defined at 0. As shown in FIG. 1, in the high magnification state, a negative lens Lp in an objective lens unit Lo is disposed in proximity to an eyepiece Le, and in the low magnification state shown in FIG. 2, a negative lens Lq in the objective lens unit Lo is disposed in proximity to the fixed optical member La on the object side, and in the objective lens unit, the negative lens Lp and the negative lens Lq are replaced with each other, whereby the viewfinder magnification is changed over from the high magnification state to the low magnitication state or vice versa.

Here, in the high magnification state (the telephoto side) shown in FIG. 1,
the viewfinder magnification is $\beta_1$,
the focal length of the objective lens is fo,
the focal length of the eyepiece is fe, and
the distance between the principal points of the objective lens Lo and the eyepiece Le is $d_1$,
and in the low magnification state (the wide angle side) shown in FIG. 2,
the viewfinder magnification is $\beta_2$,
the focal length of the objective lens is fw,
the distance between the principal points of the objective lens Lo and the eyepiece le is $d_2$, and
the magnification change ratio of the viewfinder, i.e., $\beta_1/\beta_2$, is B.

Also, if the viewfinder is assumed as a perfectly a focal system and fo<0 and fw<0 and fe>0 and $0<\beta_2<1$ and $\beta_1>0$ and B>1 and $d_1>0$ and $d_2>0$, the following relations are established:

$$\beta_1 = -fo/fe \tag{1}$$

$$d_1 = fe + fo \tag{2}$$

$$\beta_2 = -fw/fe \tag{3}$$

$$d_2 = fe + fw \tag{4}$$

From equations (1) and (2), in order that $d_1>0$, it is necessary that $\beta_1<1$.

So, solving equations (1) and (2), under the condition of $0<\beta_1<1$, $$fo = \frac{-d_1\beta_1}{1-\beta_1} \tag{5}$$

and solving equations (3) and (4), under the condition of $0<\beta_2<1$, $$fw = \frac{-d_2\beta_2}{1-\beta_2} \tag{6}$$

$$fe = \frac{d_2}{1-\beta_2} \tag{7}$$

and when fo and fe are eliminated from equations (1), (5) and (7), $$d_2 = d_1 \times \frac{1-\beta_2}{1-\beta_1} \tag{8}$$

and by setting up $\beta_1/\beta_2 = B$, equation (8) is expressed as $$d_2 = \frac{d_1(\beta_2 - 1)}{B(\beta_2 - 1/B)} \tag{9}$$

In order that a viewfinder may be contained in a camera, the full length of the viewfinder is generally limited to about the thickness of the camera body. From this point of view, the upper limit of the value of the distance $d_2$ between the principal points of the objective lens Lo and the eyepiece Le in the low magnification state is limited.

On the other hand, in the high magnification state, the objective lens comes close to the eyepiece, but because on the eyepiece side, it is necessary to dispose as fixed optical members an Albada optical system for superposing a field frame or the like in the field of view and a reflecting mirror or the like for making the field frame or the like into an illuminating window frame type, the lower limit of the value of the distance $d_1$ between the principal points of the objective lens Lo and the eyepiece Le is limited.

Figure 3:
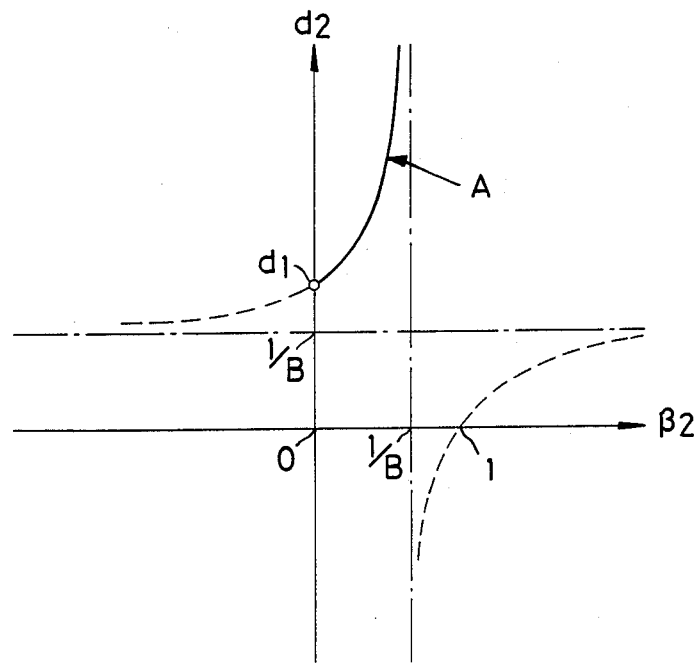
FIG. 3 is a graph showing the relation between the viewfinder magnification $\beta_2$ in the low magnification state shown in FIG. 2 and the distance $d_2$ between the principal points of an objective lens unit and an eyepiece unit.

If the value of the lower limit of $d_1$ and the magnification change ratio B are determined, the relation between $d_2$ and $\beta_2$ can assume the range of thick solid line A in FIG. 3 from the aforementioned equation (9) on the assumption that $0<\beta_2<1$, $d_2>0$ and $B>1$. It is seen from this graph that if the magnification change ratio B is fixed, the greater is $\beta_2$, the greater is the distance $d_2$ between the principal points of the objective lens and the eyepiece in the low magnification state and the result is that the full length of the viewfinder becomes greater.

For example, as a viewfinder for a so-called compact camera, it is generally desirable that the full length of the viewfinder be 36 mm or less and the full length from that surface of an inserted negative lens in the high magnification state which is adjacent to the object side to the last surface of any eyepiece be 15 mm or more, and it is preferable that $d_1$ and $d_2$ in this state be $d_2 \geq 25$ and $d_1 \geq 12$.

So, when the magnification change ratio B requires a high value of the order of 2.0 times, if for example, $d_1=12$, $d_2 \geq 25$ and $B=2.0$ are substituted into equation (9) and $\beta_2$ is solved.

$\beta_2 \geq 0.34$.

Assuming that the angle of view of the short focal length side (the wide angle end) of a photo-taking lens provided in a focal length change-over type camera is of the order of 63°, the plain magnification of the low magnification side of the viewfinder is from the order of 0.4 times to the order of 0.6 times. The calculated value ($\beta_2 \geq 0.34$) by equation (9) is below this plain magnification. Therefore, to enhance the magnification of the viewfinder and realize the plain magnification, it is necessary to make the value of $d_2$ great to the utmost and make the value of $d_1$ small to the utmost.

For this purpose, when of the prior of negative lenses Lp and Lq replaced with each other in the objective lens unit Lo, the radius of curvature of that surface of the negative lens Lq for low magnification which is adjacent to the object side is defined as $rw_1$ and the radius of curvature of that surface of said negative lens Lq which is adjacent to the eyepiece is defined as $rw_2$ and the radius of curvature of that surface of the negative lens Lp for high magnification which is adjacent to the object side is defined as $rT1$ and the radius of curvature of that surface of said negative lens Lp which is adjacent to the eyepiece is defined as $rT2$ and the shape factors $Q_W$ and $Q_T$ of those negative lenses LP and Lq are defined as $$Q_W = \frac{rw_2 + rw_1}{rw_2 - rw_1} \text{ and } Q_T = \frac{rT2 + rT1}{rT2 - rT1},$$

respectively, it is necessary that the following conditions (I) and (II) be satisfied:

$Q_W<0$           (I)

$Q_T>0$           (II)

The condition (I) above prescribes the shape of the negative lens Lq disposed in the objective lens unit in the low magnification state. The negative lens Lq which satisfies the condition (I) is a negative meniscus lens or a biconcave lens in which the second surface having the radius of curvature $rw_2$ faces the eyepiece side, and the radius of curvature $rw_1$ of the first surface is greater than the radius of curvature $rw_2$ of the second surface ($|rw_1|>|rw_2|$).

When this condition (I) is not satisfied, the curvature of the surface $rw_1$ of the negative lens Lq which is adjacent to the object side becomes greater, that is, $|rw_1|<|rw_2|$, and this lens is concave toward the object side and therefore, the marginal portion of the lens is in contact with the fixed optical member on the object side with a result that a sufficient viewfinder magnification cannot be realized.

The condition (II) prescribes the shape of the negative lens Lp disposed in the objective lens unit in the high magnification state. The negative lens Lp which satisfies the condition (II) that $Q_T>0$ is a negative meniscus lens or a biconcave lens in which the first surface having the radius of curvature $rT1$ faces the object side, and the radius of curvature $rT1$ of the first surface is smaller than the radius of curvature $rT2$ of the second surface ($|rT1|<|rT2|$).

When this condition (II) is not satisfied, the surface $rT2$ of this negative lens Lp which is adjacent to the eyepiece side is a concave surface and moreover, the curvature thereof becomes greater, that is, $|rT2|<|rT1|$ and therefore, even if the air space at the vertex is sufficient, the marginal portion of this lens may contact the optical member in the eyepiece unit with a result that a sufficient viewfinder magnification cannot be realized.

The conditions (I) and (II) are also effective for the correction of the aberrations of the viewfinder.

The principal ray which is an oblique ray entering the inverted galilean telescope type viewfinder passes through the negative objective lens, whereafter it emerges toward the eyepiece at a relatively small angle with respect to the optic axis. Because the negative refractive power of the objective lens is strong, great negative distortion usually readily occurs. In particular, in the low magnification state, the refractive power of the negative lens is great as compared with that in the high magnification state and therefore, the degree of negative distortion is liable to become greater. The condition (I) (I) is a condition for which negative distortion is not made excessively great in the low magnification state in which the angle of incidence of the oblique ray is great. When the condition (I) is not satisfied, the diverging action of that surface of the negative lens Lq inserted in the low magnification side which is adjacent to the object side becomes strong and therefore, negative distortion becomes so excessively great that it cannot be corrected.

On the other hand, on the high magnification side, the refractive power of the negative lens Lp is not so high as in the low magnification state and therefore, the influence thereof on distortion is small, and the correction of astigmatism and coma resulting from the bending of the negative Lens Lp becomes relatively important. When the condition (II) is not satisfied, the action of the divergent surface of the negative lens Lp becomes weak and therefore, the converging action of the eyepiece becomes relatively strong and astigmatism and coma cannot be corrected well.

Further, in order that aberrations may be good in both the high magnification state and the low magnification state, it is necessary that the following condition (III) be satisfied:

$-5<Q_T/Q_W<0$           (III)

This condition (III) prescribes the ratio of the shape factors $Q_W$ and $Q_T$ of the negative lenses Lq and Lp when the eyepiece unit is a fixed optical member and the magnification is changed over by replacing the negative lenses Lp and Lq with each other in the objective lens unit. Making the value of $Q_T/Q_W$ greater in the negative direction under the aforementioned conditions (I) and (II) means that the shape of the negative objective lens in the high magnification state or the low magnification state is bent more strongly toward the object side. Therefore, when the value of $Q_T/Q_W$ becomes greater in the negative direction and exceeds the lower limit of the condition (III), the diverging property of that surface of the negative objective lens which is adjacent to the object side becomes strong and thus, the negative distortion in the high magnification state or the low magnification state increases and a good viewfinder cannot be provided.

When the condition (III) exceeds its upper limit, the condition (I) or the condition (II) cannot be satisfied.

The shapes of the lenses Lp and Lq replaced with each other for the magnification change-over in the present invention as described above should desirably be in the following ranges:

$$-1.7 < Q_W < -0.2$$

$$0 < Q_T < 1.5$$

Embodiments of the present invention will hereinafter be described. The inverted galilean telescope type viewfinder shown in a first embodiment (FIGS. 4 and 5) and a second embodiment (FIGS. 6 and 7) has a parallel plane plate or a positive lens as the fixed optical member La most adjacent to the object side in the objective lens unit Lo, and the negative lenses Lp and Lq replaced with each other in the low magnification state and the high magnification state are both single lenses. The negative lens Lq for the low magnification state shown in FIGS. 4 and 6 has an aspherical surface on the image side lens surface $r_4$ thereof, and the negative lens Lp for the high magnification state shown in FIGS. 5 and 7 has an aspherical surface on the object side lens surface $r_3$ thereof. Particularly, the correction of astigmatism and curvature of image field is effected by such aspherical surfaces.

The shape of these aspherical surfaces is expressed by the following equation:

$$x = \frac{y/R}{1 + \sqrt{1 - k(y/R)^2}} + C_2 y^2 + C_4 y^4 + C_6 y^6$$

where
x: the distance of a point on the aspherical surface from the tangential plane at the vertex of the lens surface
y: the height from the optic axis
R: the radius of curvature of the vertex of the aspherical surface
k: cone constant
$C_{2i}$: aspherical surface coefficient (i=1, 2, 3)

The first embodiment is an inverted Galilean telescope type viewfinder in which the magnification change ratio is 1.88, the low magnification side angular magnification $\beta_2 = 0.42$ and the high magnification side angular magnification $\beta_1 = 0.7$. The lens construction of the first embodiment in the low magnification state is shown in FIG. 4, and the lens construction of the first embodiment in the high magnification state is shown in FIG. 5.

Figure 4:
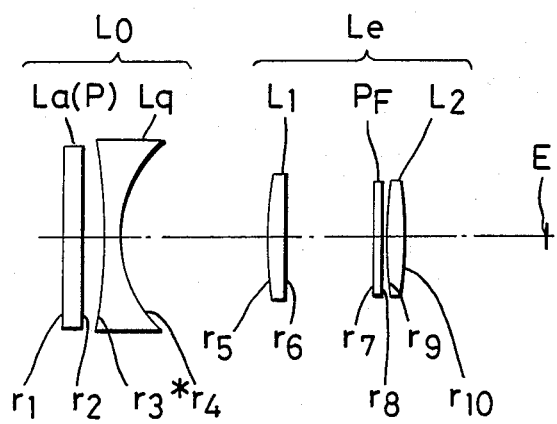
FIGS. 4 and 5 show the construction of an optical system according to a first embodiment of the present invention, FIG. 4 showing the low magnification state and FIG. 5 showing the high magnification state.
Figure 5:
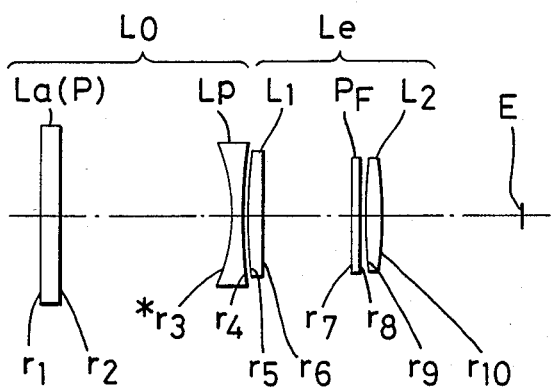

As shown in FIGS. 4 and 5, in the first embodiment, the objective lens unit Lo is comprised of a fixed parallel plane plate P as window glass, and a negative lens Lp for high magnification and a negative lens Lq for low magnification disposed alternately. The eyepiece unit Le fixed during a magnification change is comprised of a positive lens $L_1$, a parallel plane plate $P_F$ and a positive lens $L_2$.

A viewfinder field frame, not shown, is formed by vapor deposition on the surface $r_8$ of the parallel plane plate $P_F$ in the eyepiece unit Le which is adjacent to the eyepiece side, and a reflecting surface for projecting said field frame into the field of view of the viewfinder is formed on the lens surface $r_5$ of the positive lens $L_1$ which is adjacent to the object side, whereby a so-called Albada optical system is constituted. The thickness of the whole as the viewfinder optical system, i.e., the full length on the optic axis from the first surface $r_1$ to the tength surface $r_{10}$, is 36.0 mm. The length from the vertex of the object side surface $r_3$ of the negative lens Lp disposed on the eyepiece side in the high magnification state shown in FIG. 5 to the last surface $r_{10}$ of the eyepiece is 15.8 mm.

The optical data of the low magnification state and the high magnification state of the first embodiment are shown in Tables 1 and 2 below. In the tables, the numbers at the left end represent the order from the object side, and the refractive index n and the Abbe number $\nu$ are values for d-line ($\lambda = 587.6$ nm). Also, the characters EL represent the distance from the vertex of the last surface of the eyepiece unit to the eye point E.

TABLE 1

(1st Embodiment: Low Magnification State)
Angular magnification $\beta_2 = 0.42$
Angle of view $2\omega = 54°$

| No. | Radius of curvature r | Center thickness and space d | Refractive index n | Abbe number $\nu$ | |
|---|---|---|---|---|---|
| 1 | ∞ | 2.000 | 1.49108 | 57.57 | Lo |
| 2 | ∞ | 2.200 | | | |
| 3 | −47.552 | 1.200 | 1.49108 | 57.57 | |
| 4 | *10.579 | 16.400 | | | |
| 5 | 40.722 | 1.700 | 1.49108 | 57.57 | Le |
| 6 | 833.730 | 9.500 | | | |
| 7 | ∞ | 0.700 | 1.52216 | 58.80 | |
| 8 | ∞ | 0.500 | | | |
| 9 | 71.618 | 1.800 | 1.49108 | 57.57 | |
| 10 | −71.618 | EL = 15.0 | | | |

*Aspherical surface k = 0.09
$Q_W = -0.636$
$C_2 = 0$
$C_4 = -5.1 \times 10^{-6}$
$C_6 = -5.0 \times 10^{-8}$

TABLE 2

(2nd Embodiment: High Magnification State)
Angular magnification $\beta_2 = 0.79$
Angle $2\omega = 30°$

| No. | Radius of curvature r | Center thickness and space d | Refractive index n | Abbe number $\nu$ | |
|---|---|---|---|---|---|
| 1 | ∞ | 2.000 | 1.49108 | 57.57 | Lo |
| 2 | ∞ | 18.200 | | | |
| 3 | *−19.996 | 1.200 | 1.49108 | 57.57 | |
| 4 | 89.827 | 0.400 | | | |
| 5 | 40.722 | 1.700 | 1.49108 | 57.57 | Le |
| 6 | 833.730 | 9.500 | | | |
| 7 | ∞ | 0.700 | 1.52216 | 58.80 | |
| 8 | ∞ | 0.500 | | | |
| 9 | 71.618 | 1.800 | 1.49108 | 57.57 | |

TABLE 2-continued (2nd Embodiment: High Magnification State)
Angular magnification $\beta_2 = 0.79$
Angle $2\omega = 30°$

| No. | Radius of curvature r | Center thickness and space d | Refractive index n | Abbe number $\nu$ |
|---|---|---|---|---|
| 10 | −71.618 | EL = 15.0 | | |

*Aspherical surface k = −0.65
$C_2 = C_4 = C_6 = 0$
$Q_T = 0.636$
$Q_T/Q_W = -1.0$ Although the first lens La is a parallel plane fixed optical member P, this portion can be made into a protective member for the front face of the camera, and these surfaces may also be endowed with curvatures to thereby enhanced the degree of freedom of the aberration correction.

Figure 6:
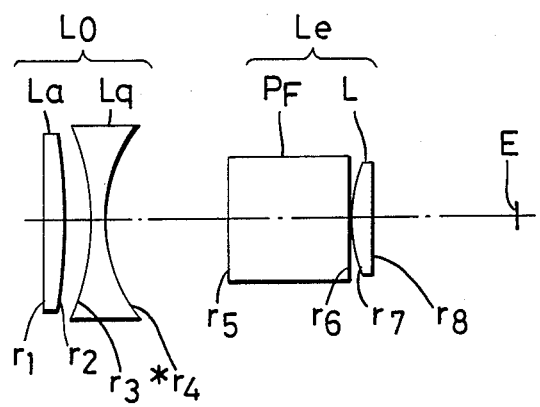
FIGS. 6 and 7 show the construction of an optical system according to a second embodiment of the present invention, FIG. 6 showing the low magnification state and FIG. 7 showing the high magnification state.

The second embodiment of the present invention is an inverted Galilean telescope type viewfinder in which the magnification change ratio is 2.0, the low magnification side angular magnification $\beta_2=0.41$ and the high magnification side angular magnification $\beta_1=0.82$. FIG. 6 shows the lens construction of the second embodiment in he low magnification state, and FIG. 7 shows the lens construction of the second embodiment in the high magnification state.

Figure 7:
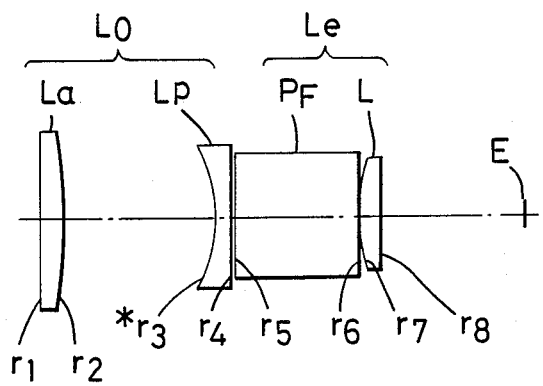
Figure 8:
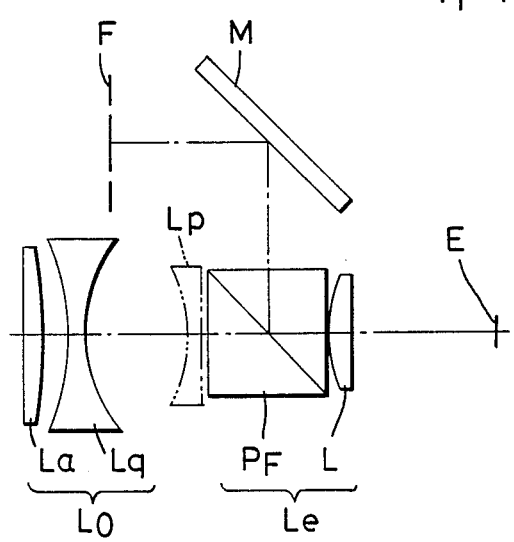
FIG. 8 shows the construction of an optical system according to an embodiment constructed with the second embodiment of FIG. 6 as an illuminating window type bright frame viewfinder.

As shown in FIGS. 6 and 7, the objective lens unit Lo is comprised of a positive lens La as a fixed optical member disposed most adjacent to the object side, and a negative lens Lg for the low magnification state and a negative lens Lp for the high magnification state replaced with each other. The eyepiece unit Le is comprised of a parallel plane optical member $P_F$ and a plano-convex lens L. As shown in FIG. 8, the parallel plane member $P_F$ is a beam splitter, and the light beam from a field frame member F is directed to this beam splitter by a reflecting mirror M, whereby the image of the field frame is superposed in he field of view and thus, a so-called illuminating window type bright frame viewfinder is constituted.

In the second embodiment, the thickness of the whole as the viewfinder optical system, i.e., the full length on the optic axis from the first surface $r_1$ to the eighth surface $r_8$ is 36.0 mm. Also, the length from the front surface $r_3$ of the inserted negative lens in the high magnification state to the last surface $r_8$ of the eyepiece is 16.8 mm.

The optical data of the low magnification state and the high magnification state of the second embodiment are shown in Tables 3 and 4 below.

TABLE 3

(2nd Embodiment: Low Magnification State)
Angular magnification $\beta_2 = 0.41$
Angle of view $2\omega = 54°$

| No. | Radius of curvature r | Center thickness and space d | Refractive index n | Abbe number $\nu$ | |
|---|---|---|---|---|---|
| 1 | ∞ | 2.000 | 1.49108 | 57.57 | Lo |
| 2 | −85.000 | 3.000 | | | |
| 3 | −24.400 | 1.200 | 1.49108 | 57.57 | |
| 4 | *10.670 | 14.400 | | | |
| 5 | ∞ | 13.000 | 1.51680 | 64.12 | Le |
| 6 | ∞ | 0.200 | | | |
| 7 | 20.500 | 2.200 | 1.49108 | 57.57 | |
| 8 | ∞ | EL = 15.0 | | | |

*Aspherical surface k = −0.70
$Q_W = -0.392$
$C_2 = C_4 = C_6 = 0$

TABLE 4

(2nd Embodiment: High Magnification State)
Angular magnification $\beta_2 = 0.82$
Angle of view $2\omega = 28°$

| No. | Radius of curvature r | Center thickness and space d | Refractive index n | Abbe number $\nu$ | |
|---|---|---|---|---|---|
| 1 | ∞ | 2.000 | 1.49108 | 57.57 | Lo |
| 2 | −85.000 | 17.200 | | | |
| 3 | *−12.200 | 1.200 | 1.49108 | 57.57 | |
| 4 | −697.820 | 0.200 | | | |
| 5 | ∞ | 13.000 | 1.51680 | 64.12 | Le |
| 6 | ∞ | 0.200 | | | |
| 7 | 20.500 | 2.200 | 1.49108 | 57.57 | |
| 8 | ∞ | EL = 15.0 | | | |

*Aspherical surface k = −0.60
$C_2 = C_4 = C_6 = 0$
$Q_T = 1.036$  $Q_T/Q_W = -2.643$ As is apparent from Tables 1 to 4 above, each embodiment, in spite of its being of a simple construction and of a compact shape, maintains a very good performance in both the low magnification state and the high magnification state.

What is claimed is:

1. A viewfinder system capable of changing over the magnification including an objective lens unit having at lest two negative lens elements replaceable with each other for magnification change-over, and an eyepiece unit having a positive refractive power and constituting an inverted Galilean telescope type viewfinder with said objective lens unit and wherein when the radius of curvature of that surface of one negative lens element for low magnification which is adjacent to the object side is $rw_1$ and the radius of curvature of that surface of said one negative lens element which is adjacent to the eyepiece side is $rw_2$ and the radius of curvature of that surface of the other negative lens element for high magnification which is adjacent to the object side is $rT1$ and the radius of curvature of that surface of said other negative lens element which is adjacent to the eyepiece side is $rT2$ and $Q_W$ and $Q_T$ are defined as $$Q_W=(rw_2+rw_1)/(rw_2-rw_1)$$

$$Q_T=(rT2+rT1)/(rT2-rT1),$$

said two negative lens elements replaceable with each other satisfy the following conditions:

$$Q_W<0 \qquad (1)$$

$$Q_T>0 \qquad (2)$$

$$-5<Q_T/Q_W<0. \qquad (3)$$

2. A viewfinder system according to claim 1, wherein the shape factors $Q_W$ and $Q_T$ of said negative lens element for low magnification and said negative lens element for high magnification replaceable with each other for magnification change-over are respectively set within the following ranges:

$$-1.7 < Q_W < -0.2$$

$$0 < Q_T < 1.5.$$

3. A viewfinder system according to claim 1, wherein said negative lens element for low magnification has its first surface adjacent to the object side formed by a spherical surface and its second surface adjacent to the eyepiece side formed by an aspherical surface, and said negative lens element for high magnification has its first surface adjacent to the object side formed by an aspherical surface and its second surface adjacent to the eyepiece side formed by a spherical surface.

4. A viewfinder system according to claim 1, wherein said negative lens element for low magnification is comprised of a biconcave lens in which the radius of curvature of the first surface adjacent to the object side is greater than the radius of curvature of the second surface adjacent to the eyepiece side, and said negative lens element for high magnification is comprised of a concave lens in which the radius of curvature of the first surface adjacent to the object side is smaller than the radius of curvature of the second surface adjacnet to the eyepiece side and whose focal length is greater than the focal length of said negative lens element for low magnification.

5. A viewfinder system according to claim 1, wherein said eyepiece unit includes an eyepiece component and a beam splitter for the observation of a field frame, said beam splitter being disposed on the object side relative to said eyepiece component, said negative lens element for low magnification is inserted on the viewfinder optic axis spaced apart by a predetermined distance from said beam splitter, and said negative lens element for high magnification is inserted on the viewfinder optic axis proximate to said beam splitter.

6. A viewfinder system according to claim 1, characterized by the following data:

| No. | Radius of curvature r | Center thickness and space d | Refractive index n | Abbe number ν | |
|---|---|---|---|---|---|
| 1 | ∞ | 2.000 | 1.49108 | 57.57 | Low |
| 2 | ∞ | 2.200 | | | magnification |
| 3 | −47.552 | 1.200 | 1.49108 | 57.57 | fication |
| 4 | *10.579 | 16.400 | | | Lo |
| 1 | ∞ | 2.000 | 1.49108 | 57.57 | High |
| 2 | ∞ | 18.200 | | | magnification |
| 3 | *−19.996 | 1.200 | 1.49108 | 57.57 | fication |
| 4 | 89.827 | 0.400 | | | Lo |
| 5 | 40.722 | 1.700 | 1.49108 | 57.57 | Le |
| 6 | 833.730 | 9.500 | | | |
| 7 | ∞ | 0.700 | 1.52216 | 58.80 | |
| 8 | ∞ | 0.500 | | | |
| 9 | 71.618 | 1.800 | 1.49108 | 57.57 | |
| 10 | −71.618 | EL = 15.0 | | | |

Low magnification state
Angular magnification $\beta_2 = 0.42$
Angle of view $2\omega = 54°$
*Aspherical surface k = 0.09
$Q_W = -0.636$
$C_2 = 0$
$C_4 = -5.1 \times 10^{-6}$
$C_6 = -5.0 \times 10^{-8}$
High magnification state
Angular magnification $\beta_2 = 0.79$
Angle of view $2\omega = 30°$
*Aspherical surface k = −0.65
$C_2 = C_4 = C_6 = 0$
$Q_T = 0.636$
$Q_T/Q_W = -1.0$

7. A viewfinder system according to claim 1, characterized by the following data:

| No. | Radius of curvature r | Center thickness and space d | Refractive index n | Abbe number ν | |
|---|---|---|---|---|---|
| 1 | ∞ | 2.000 | 1.49108 | 57.57 | Low |
| 2 | −85.000 | 3.000 | | | magnification |
| 3 | −24.400 | 1.200 | 1.49108 | 57.57 | fication |
| 4 | *10.670 | 14.400 | | | Lo |
| 1 | ∞ | 2.000 | 1.49108 | 57.57 | High |
| 2 | −85.000 | 17.200 | | | magnification |
| 3 | *−12.200 | 1.200 | 1.49108 | 57.57 | fication |
| 4 | −697.820 | 0.200 | | | Lo |
| 5 | ∞ | 13.000 | 1.51680 | 64.12 | Le |
| 6 | ∞ | 0.200 | | | |
| 7 | 20.500 | 2.200 | 1.49108 | 57.57 | |
| 8 | ∞ | EL = 15.0 | | | |

Low magnification state
Angular magnification $\beta_2 = 0.41$
Angle of view $2\omega = 54°$
*Aspherical surface k = −0.70
$Q_W = -0.392$
$C_2 = C_4 = C_6 = 0$
High magnification state
Angular magnification $\beta_2 = 0.82$
Angle of view $2\omega = 28°$
*Aspherical surface k = −0.60
$C_2 = C_4 = C_6 = 0$
$Q_T = 1.036$
$Q_T/Q_W = -2.643$

* * * * *